United States Patent [19]
Green, Jr.

[11] Patent Number: 5,608,724
[45] Date of Patent: Mar. 4, 1997

[54] DYNAMICALLY RECONFIGURABLE FREQUENCY DIVISION MULTIPLEXER AND MODULATOR

[75] Inventor: Donald R. Green, Jr., San Marcos, Calif.

[73] Assignee: Nippondenso Co., Ltd., Kariya, Japan

[21] Appl. No.: 534,291

[22] Filed: Sep. 27, 1995

[51] Int. Cl.$^6$ ............................................. H04J 4/00
[52] U.S. Cl. ................. 370/307; 370/330; 370/484
[58] Field of Search ...................... 370/49.1, 12, 29, 370/30, 32, 45, 49.5, 50, 57, 58.1, 69.1, 68.1, 120, 123, 121, 122, 71, 77, 95.1, 95.3, 97, 110.1, 105.2, 112, 70, 109, 124, 76, 53, 582, 58.3; 455/4.2, 13.3, 17, 20, 22, 23, 25, 33.1, 33.3, 34.1, 37.1, 42, 62, 101, 135, 50.1, 12, 72, 103, 80–83, 117, 114, 279.1; 379/24.2; 340/925.79; 359/118, 123, 125; 375/200, 214, 218, 224, 239, 260, 265, 267, 269, 275, 347, 349, 350, 351, 335, 337, 324, 322, 299, 302, 304, 307, 328, 306, 259, 261, 295, 298, 316, 340; 330/10, 9

[56] References Cited

U.S. PATENT DOCUMENTS

| | | | |
|---|---|---|---|
| 4,813,035 | 3/1989 | Bishop et al. | 370/50 |
| 4,922,483 | 5/1990 | Kobayashi | 370/50 |
| 5,175,878 | 12/1992 | Davis et al. | 455/103 |
| 5,210,771 | 5/1993 | Schaeffer et al. | 375/200 |
| 5,274,627 | 12/1993 | De Santis | 370/49.5 |
| 5,311,504 | 5/1994 | Colamonico et al. | 370/50 |
| 5,406,553 | 4/1995 | Smith et al. | 370/49.5 |

*Primary Examiner*—Benedict V. Safourek
*Assistant Examiner*—Dang Ton
*Attorney, Agent, or Firm*—Cushman, Darby & Cushman IP Group of Pillsbury Madison & Sutro LLP

[57] ABSTRACT

A dynamically reconfigurable frequency division multiplexer and modulator accepts multiple input signals, each of which is individually time division multiplexed. Each input signal is used to modulate a carrier signal having a unique frequency. Switches are used to selectively form one or more groups from the modulated signals, and the signals in each group are frequency division multiplexed by summing them together. In a Personal Communication Service environment, the output for each group may be fed to a respective antenna and the switches and carrier signals controlled to selectively associate inputs signals, carrier frequencies and antennas to implement antenna diversity operations and compensate for signal degradation due to multipath propagation effects.

21 Claims, 8 Drawing Sheets

DYNAMICALLY RECONFIGURABLE FREQUENCY DIVISION MULTIPLEXER AND MODULATOR

BACKGROUND OF THE INVENTION

1. Field of the Invention

This invention is directed to RF cellular and personal communications systems. More particularly, it is directed to base stations for such systems operating in a multipath transmission and reception environment.

2. Description of the Related Art

RF cellular and personal communication service systems (hereinafter referred to collectively as "PCS systems") typically operate with one or more fixed base stations and a number of low-powered portable terminals. When a portable terminal is used, it establishes a communication session with a base station. Although the portable terminal communicates only with the base station, the base station may service a number of portable terminals at the same time. The base station may provide a virtual connection between two currently active portable terminals, or it may provide a connection between the portable terminal and a conventional telephone network or the like.

Radio waves typically travel from transmitter to receiver in several different modes. For example, ground wave or surface wave propagation occurs when radio waves impact the ground and propagate toward the receiver through the Earth's surface due to its electrical conductivity. Sky wave propagation occurs when space-bound radio waves from a transmitter are refracted in the Earth's ionosphere and directed back toward the receiver. Finally, space wave propagation includes the direct, line-of-sight transmission of radio waves from transmitter to receiver as well as reflected waves which bounce off the Earth's surface, natural features or man-made objects one or more times before they reach the receiver. Due to the particular dielectric characteristics of the Earth's surface and ionosphere when they serve as transmission media, the primary mode of transmission in PCS systems is usually space wave propagation.

Since radio signals travelling in space propagation mode may be reflected one or more times before reaching the receiver. For example, FIG. 1 shows a typical personal telephone system in which two portable terminals 20 and 22 receive signals from a base station 24 by both line-of-sight propagation and by scattering off a building 26 and a car 28, respectively. Since the distance travelled by a line-of-sight signal and a scattered signal (or by two scattered signals travelling on different paths) will differ, the signals will be out of phase with one another at the receiver. If the phase difference is an even multiple of $\pi$ (corresponding to a delay of 360°, 720°, etc.), the result is constructive interference in which the composite received signal is reinforced. Small multiples corresponding to a short delay simply increase the effective signal strength of the composite received signal; however, if the transmitted signal is modulated with, e.g., digital data, large multiples corresponding to long delays can result in an "echo" effect which blurs the boundaries between adjacent modulated fields. This effect is known as inter-symbol interference.

On the other hand, if the phase difference is an odd multiple of $\pi$ (corresponding to a 180°, 540°, etc. phase difference), the two signals will be opposite in phase to one another, and the received signals will completely cancel out one another. Of course, phase differences that are not integer multiples of $\pi$ will result in partial cancellation of the received signal, a lower level of inter-symbol interference, a reduction in the signal-to-noise ratio of the received signal, and the like.

One method of compensating for the destructive effects of multipath wave propagation as described above involves the use of diversity, or choosing one of two or more different transmission paths which is superior in quality. The most common diversity methods are frequency diversity, in which the best of a number of signals transmitted at different frequencies is used; polarization diversity, in which the better of a horizontally polarized signal and a vertically polarized signal is used; and space diversity or antenna diversity, in which the best signal transmitted (or received) using multiple antennas separated by a number of wavelengths is used.

Antenna diversity has proven to be the most viable means of multipath propagation compensation in PCS systems; however, its implementation is constrained by a number of factors. For example, portable terminals in PCS systems are typically hand-held or otherwise small-scale units which do not readily permit effective physical separation of multiple antennas. Moreover, the use of antenna diversity at the receiver requires the use of accompanying circuitry to select the optimal received signal, thus further increasing the size as well as the power consumption and cost of the portable terminal.

For these reasons, the use of antenna diversity at the base station side is preferable. Although this technique provides the lowest cost, size and power consumption characteristics for the portable terminals, it requires relatively sophisticated signal path control at the base station for reasons that will soon become apparent.

The capacity of most PCS communication standards is too limited for the system to be used in a dedicated, one user per communication channel mode. For example, the Digital European Cordless Telephone (DECT) standard provides twelve speech channels per RF channel; the GSM standard provides eight; and the Personal Handy Phone (PHS), Personal Digital Cellular (PDC) and IS54 digital standards permit only three each. To be practical, therefore, some technique must be used to increase the information-carrying capacity of signals conforming to such standards.

Two such methods are time division multiplexing (TDM) and frequency division multiplexing (FDM). A TDM signal is divided into sequential frames, and multiple information signals (e.g., user voice signals) are each assigned a different, fixed time slot within a frame. Each of the information signals is repetitively sampled at a point corresponding to its time slot, and the frame based on the samples is transmitted. When received, portions of the TDM signal corresponding to time slots of each information signal are recombined with each other to reconstruct the original signals.

On the other hand, an FDM signal contains a number of information signals which originally occupied the same frequency band. The frequencies of the different information signals are offset so they do not overlap with one another and distributed within the range of the FDM signal bandwidth. A familiar example of an FDM signal is the AM radio band, in which an FDM signal having a bandwidth of 1070 kHz (from 535 to 1605 kHz) can simultaneously carry 107 signals each having a 5 kHz bandwidth, where each signal is separated from adjacent signals by 10 kHz.

These two techniques can of course be combined for maximum information carrying capacity. For example, a PCS system which uses an FDM signal frequency multiplexing four signals, each of which is a TDM signal time multiplexing four user information signals can effectively support sixteen users as shown in TABLE 1:

TABLE 1

| Time Slot | Frequency Channel | | | |
|---|---|---|---|---|
| | A | B | C | D |
| I | User 1 | User 5 | User 9 | User 13 |
| II | User 2 | User 6 | User 10 | User 14 |
| III | User 3 | User 7 | User 11 | User 15 |
| IV | User 4 | User 8 | User 12 | User 16 |

If such a system is implemented using antenna diversity, frequent reallocation of users and time slots among frequency channels may be necessary. For example, consider an antenna diversity system using two antennas 30 and 32 as shown in FIG. 1. Users 5 and 7 may be at physical locations where antenna 30 provides the best communication path, and User 6 may be at a position where antenna 32 provides superior results. In this case, Frequency Channel B must be directed to antenna 30 during time slot I, redirected to antenna 32 during time slot II, and then directed back to antenna 30 during time slot III.

This switching must be done with similar allocations occurring simultaneously on the other frequency channels. Therefore, in any given time slot, a particular antenna may be transmitting all frequency channels, only some of the channels, or no channels at all. Generally speaking, the base station may be required to move from any arbitrary allocation of frequency channels to antennas at one time slot to a completely different and unpredictable allocation at the next time slot.

Prior art frequency division multiplexers such as the one shown in FIG. 2 are unable to perform such a function. In such multiplexers, N TDM digital quadrature input channels $C_1$-$C_N$ are each fed to a respective quadrature modulator $34_1$-$34_N$. In the modulators, the respective input channel $C_1$-$C_N$ is used to modulate a carrier signal $F_1$-$F_N$ having a unique frequency from an associated local oscillator $36_1$-$36_N$. The outputs of the modulators $34_1$-$34_N$ are fed to a summing amplifier 38 which combines the signals to produce an FDM output signal T, where each of the multiplexed components of the FDM signal T is a digital TDM signal.

One solution to the above problem is to arbitrarily assign each of the frequency channels to one of the antennas. For example, assume in the arrangement of TABLE 1 that Frequency Channels A and B are assigned to antenna 30, while Frequency Channels C and D are assigned to antenna 32. This avoids the need to dynamically reassign frequency channels to antennas; however, it reduces system efficiency in the process. For example, during Time Slot II, if antenna 30 provides the best communication path for Users 2 and 6 and antenna 32 provides the best communication path for Users 10 and 14, all is well. If, however, User 10 is also best served by antenna 30, the system cannot accommodate all three users with the two frequency channels assigned to antenna 30, and one of the users' signals would be transmitted under less than optimal conditions.

SUMMARY OF THE INVENTION

In view of the above problems, it is an object of the present invention to provide a method of dynamically allocating users of a communication system to communication channels and transmission facilities thereof which places only minimal constraints on system efficiency and protocol usage.

It is another object of the present invention to provide a circuit for dynamically allocating users of a communication system to communication channels and transmission facilities thereof which has a minimal impact on system efficiency, complexity and power consumption.

It is a further object of the present invention to provide a frequency division multiplexer which is capable of multiplexing an arbitrary number of inputs over an arbitrary number of outputs.

It is still a further object of the present invention to provide a frequency division multiplexer which is capable of reconfiguring signal paths for time division multiplexed signals on a time slot to time slot basis.

It is a further object of the present invention to provide a base station for a personal communication service system which can fully implement diversity techniques to provide optimal communication paths between itself and system users.

These and other objects are realized by providing a dynamically reconfigurable frequency division multiplexer and modulator (DRFDM$^2$) which accepts multiple inputs and provides multiple outputs. In a preferred embodiment, each of the inputs is connected to a modulator which modulates a local RF or IF oscillator signal with the input signal. The output of each modulator is selectively switched to an input of one of a number of output amplifiers. Each amplifier receives the output of one or more modulators at its inputs, sums the inputs signals, and generates an FDM output signal representative thereof for application to an antenna. It is also possible that the inputs are connected to the modulators via a crosspoint switch and the modulator outputs are directly connected to the output amplifiers. Further, the modulators may be selectively switched between an array of local oscillators.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
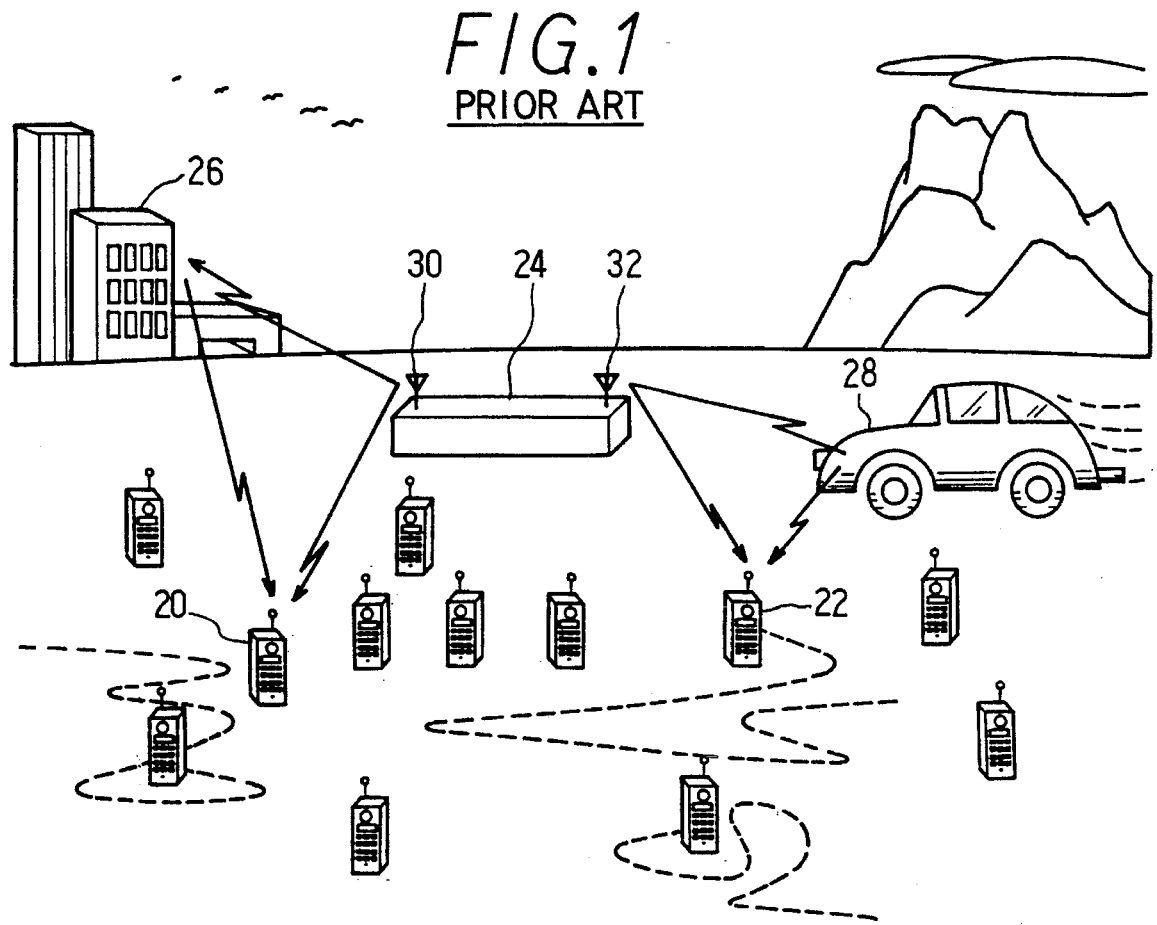
FIG. 1 shows multipath propagation conditions in a typical PCS system.
Figure 2:
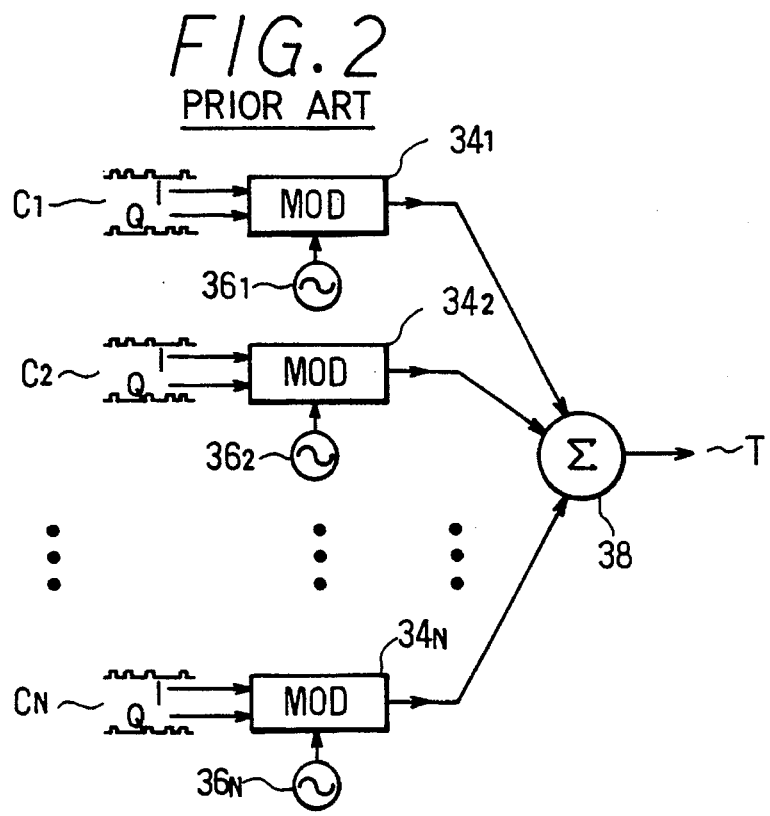
FIG. 2 is a block diagram of a typical frequency division multiplexer according to the prior art.
Figure 3:
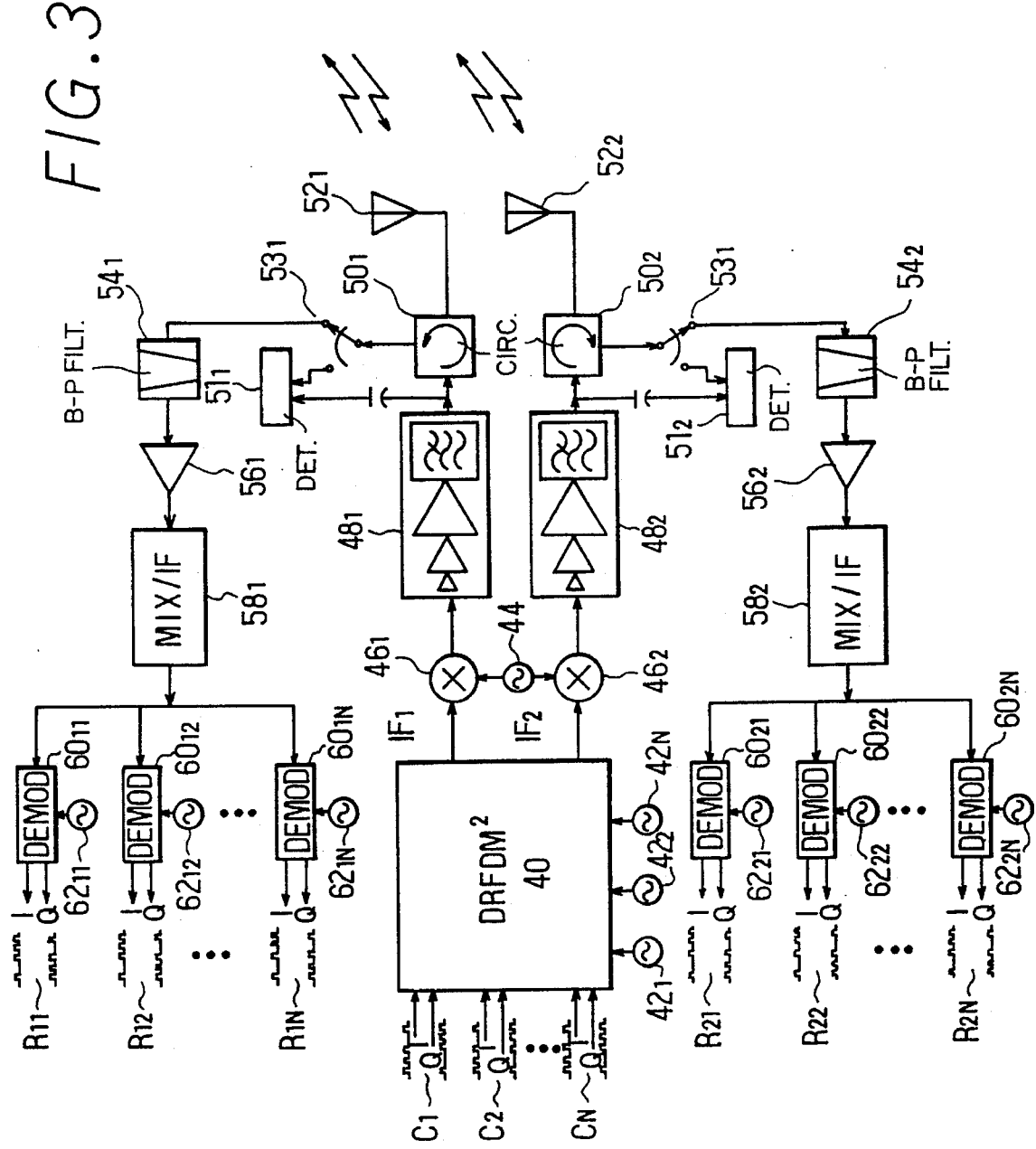
FIG. 3 is a block diagram of a PCS base station according to a first embodiment of the present invention.

In a base station transceiver according to a first embodiment of the present invention, a DRFDM$^2$ circuit 40 receives N digital input signal channels $C_1$-$C_N$ as shown in FIG. 1. The input channels $C_1$-$C_N$ may be generated from, for example, audio signals using appropriate pulse code modulation (PCM) circuits or the like. For simplicity, such circuitry is not shown in FIG. 1; however, its structure will be readily apparent to those skilled in the art.

The DRFDM$^2$ circuit 40 also receives N carrier signals from a bank of intermediate frequency (IF) local oscillators $42_1$-$42_N$. The DRFDM$^2$ circuit 40 modulates the carriers as described below to generate two frequency division modulated IF signals IF$_1$ and IF$_2$. Each of the signals IF$_1$ and IF$_2$ may include one or more of the carriers each modulated by a respective input channel $C_1$-$C_N$.

The signals IF$_1$ and IF$_2$ are combined with a signal from a radio frequency (RF) local oscillator 44 in mixers $46_1$ and $46_2$, respectively. The FDM RF signals therefrom are respectively fed to power amplifiers $48_1$ and $48_2$. Amplifiers $48_1$ and $48_2$ are preferably high efficiency power amplifiers which each include an integral low pass filter. The outputs of amplifiers $48_1$ and $48_2$ pass through circulators $50_1$ and $50_2$ and are radiated as transmitted radio signals via antennas $52_1$ and $52_2$, respectively.

The function of each of circulators $50_1$ and $50_2$ is to selectively direct incoming signals at its transmitter port to its antenna port, and to direct incoming signals at its antenna port to its receiver port. In this way, when the system is operating in half duplex mode, powerful transmit signals are not passed to the receiver where they might damage its sensitive front end. Also, the circulators $50_1$ and $50_2$ prevent received signals from being passed to the transmitter, where they might be reflected and subsequently degrade the received signal quality at the receiver. Preferably, the circulators $50_1$ and $50_2$ are of the type disclosed in U.S. patent application Ser. No. 08/434,763 to Green, the contents of which are hereby incorporated by reference.

Small parts of the signals from power amplifiers $48_1$ and $48_2$ are tapped by detectors $51_1$ and $51_2$, respectively. If necessary, the controller can cause RF switches $53_1$ and $53_2$ to feed the signals received by antennas $52_1$ and $52_2$ to the detectors $51_1$ and $51_2$ to monitor the condition of the antennas $52_1$ and $52_2$. Otherwise, the RF switches $53_1$ and $53_2$ are left in the positions shown in FIG. 4 for diversity operations as described below.

When antennas $52_1$ and $52_2$ of the base station transceiver receive signals from portable terminals, they pass via circulators $50_1$ and $50_2$ to band pass filters $54_1$ and $54_2$, low noise amplifiers $56_1$ and $56_2$, and mixer/IF sections $58_1$ and $58_2$ (if used) respectively. The FDM components of the outputs of mixer/IF sections $58_1$ and $58_2$ are respectively processed by demodulators $60_{11}$-$60_{1N}$ using IF oscillators $62_{11}$-$62_{1N}$ and demodulators $60_{21}$-$60_{2N}$ using IF oscillators $62_{21}$-$62_{2N}$ to the original PCM digital input channels $R_{11}$-$R_{1N}$ and $R_{21}$-$R_{2N}$. A controller (not shown) compares the signal quality of corresponding pairs of signals $R_{11}$ and $R_{21}$, $R_{12}$ and $R_{22}$, etc. from antennas $52_1$ and $52_2$ and controls the DRFDM$^2$ to direct the corresponding input channel $C_1$, $C_2$, etc. to the antenna $52_1$ or $52_2$ which provides the best signal path in the next time slot based on that comparison.

It should be noted that while the above system implements antenna diversity to obtain the best antenna for receiving a particular portable terminal's transmitted signal, it can also implement antenna diversity to obtain the best antenna for transmitting a signal to that terminal. This is because frequency reciprocity typically used in PCS systems between the base station and the portable terminal dictates that the transmit and receive frequencies will be the same or nearly the same, i.e., within the same frequency band. Therefore, an antenna which provides optimal reception of a portable terminal signal will probably also provide optimal transmission of a signal to that portable terminal at around the same time.

Figure 4:
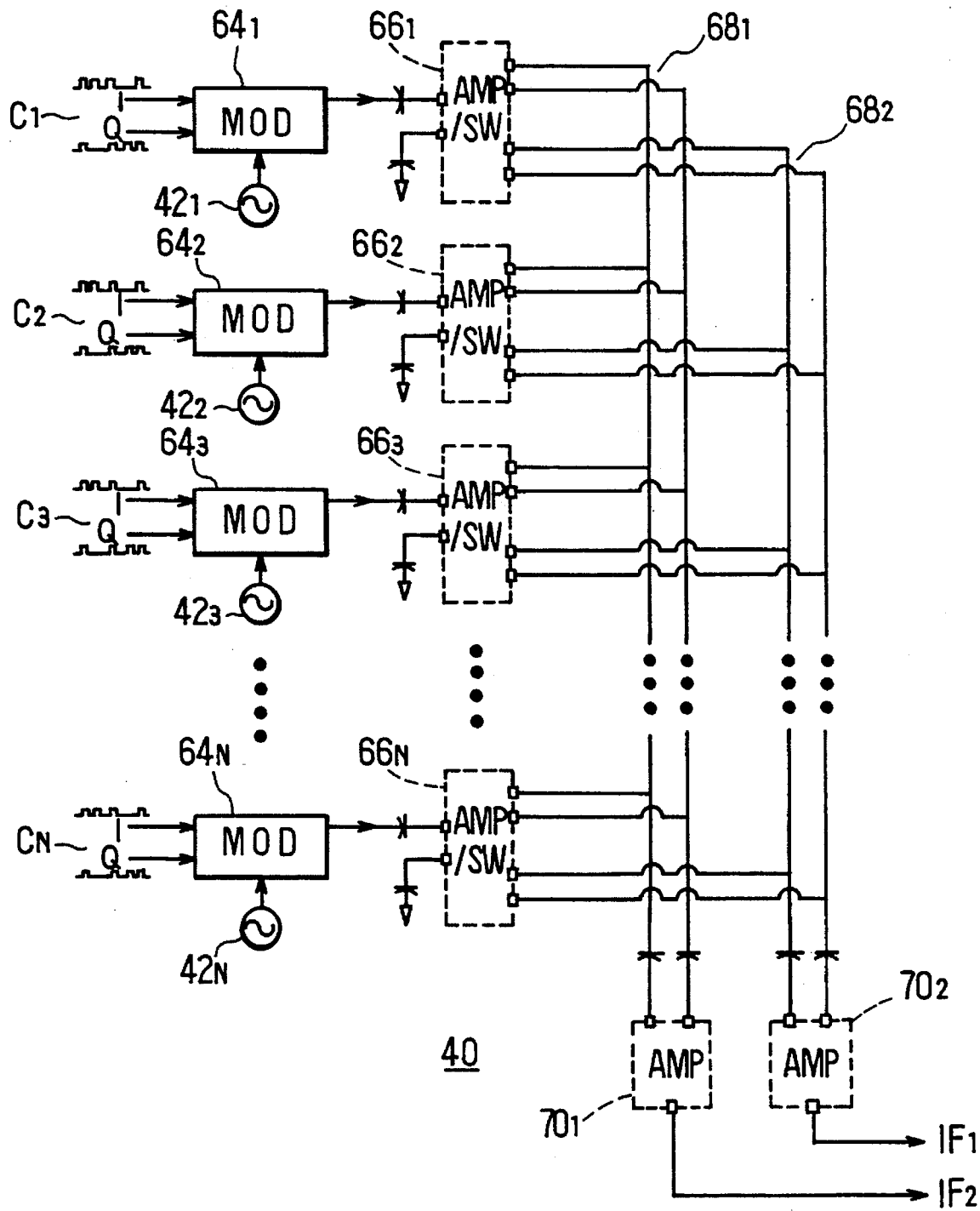
FIG. 4 is a block diagram of a DRFDM$^2$ according to the first embodiment.

Detailed operation of the DRFDM$^2$ 40 is shown in FIG. 4, in which the input channels $C_1$-$C_N$ are used by respective modulators $64_1$-$64_N$ to modulate carrier signals from local oscillators $42_1$-$42_N$. Each modulated signal is fed to a corresponding balanced input amplifier/switch subcircuit $66_1$-$66_N$ (described in greater detail below) which amplifies the modulated signal and directs it to one of two balanced busses $68_1$ and $68_2$. The signals on busses $68_1$ and $68_2$ are summed and amplified by output amplifiers $70_1$ and $70_2$ (also further described below), respectively, to generate IF signals IF$_1$ and IF$_2$.

Preferably, the signal path between the input amplifier/switch subcircuits $66_1$-$66_N$ and the output amplifiers $70_1$ and $70_2$ are balanced as described above because such circuits are superior in their immunity to signal interference and fabrication processing variations.

Figure 5:
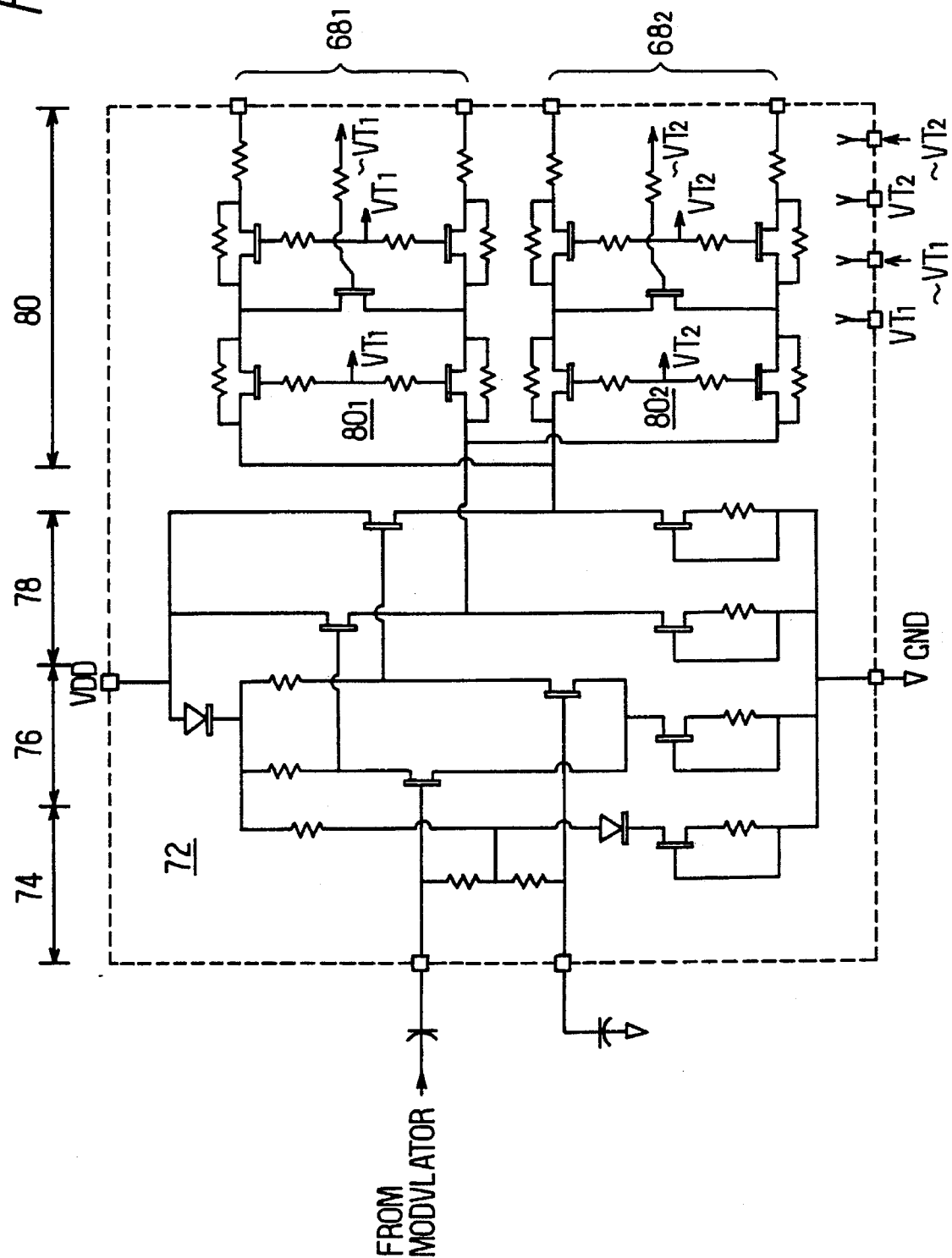
FIG. 5 is a schematic diagram of an input amplifier and switch subcircuit of the DRFDM$^2$ of FIG. 4.

In the input amplifier section 72 of a representative balanced input amplifier/switch subcircuit 66 as shown in FIG. 5, the signal from the modulator passes through an input bias network 74 to a differential amplifier stage 76 which provides signal gain for the input signal as well as unbalanced to balanced signal conversion. The balanced output of the differential amplifier stage 76 goes to a source follower stage 78 which provides a high current source for signal combiner networks in output amplifiers $70_1$ and $70_2$ (described in more detail below). The balanced output of the source follower stage 78 is applied to switches $80_1$ and $80_2$ of switch section 80 which selectively present the amplified, modulated signal at a pair of outputs connected to bus $68_1$ or at a pair of outputs connected to bus $68_2$ based on two pairs of complementary control signals VT$_1$/~VT$_1$ and VT$_2$/~VT$_2$ applied thereto from the aforementioned controller.

Using switch $80_1$ as an example, when control signal VT$_1$ is high and its complement ~VT$_1$ is low, the series-connected FETs are biased on and the shunt FET is biased off so that the switch $80_1$ is in an "on" state; thus, the switch $80_1$ has a low insertion loss and passes the output of source follower stage 78 to the bus $68_1$. When VT$_1$ is low and ~VT$_1$ is high, the series-connected FETs are biased off and the shunt FET is biased on so that the switch $80_1$ is in an "off" state; thus, the switch $80_1$ has a high insertion loss, and the output of source follower stage 78 does not appear on the bus $68_1$.

Since the control inputs carrying signals VT$_1$ and VT$_2$ and their respective complements are not connected to one another, the input signal may be isolated from both buses $68_1$ and $68_2$. If it is known that a particular channel's input signal will always be connected to either the $68_1$ bus or the $68_2$ bus for any given time slot, each control input can be connected to the complement of the other, i.e., VT$_1$ connected to ~VT$_2$ and ~VT$_1$ connected to VT$_2$, to reduce the number of switch control lines for that particular channel by half.

Because the common mode output voltage from the source follower stage 78 which provides drain and source bias to the FETs in the switch sections $80_1$ and $80_2$ is midway between VDD and ground, the power supply for the circuit and its control voltages can be driven directly from CMOS-compatible control logic for many GaAs FET IC technology switch transistors. Preferably, the input amplifier/switch subcircuits $66_1$-$66_N$ are implemented using GaAs MESFET ICs for maximum performance; however, Si MOS or BiCMOS technologies may also be used.

Figure 6:
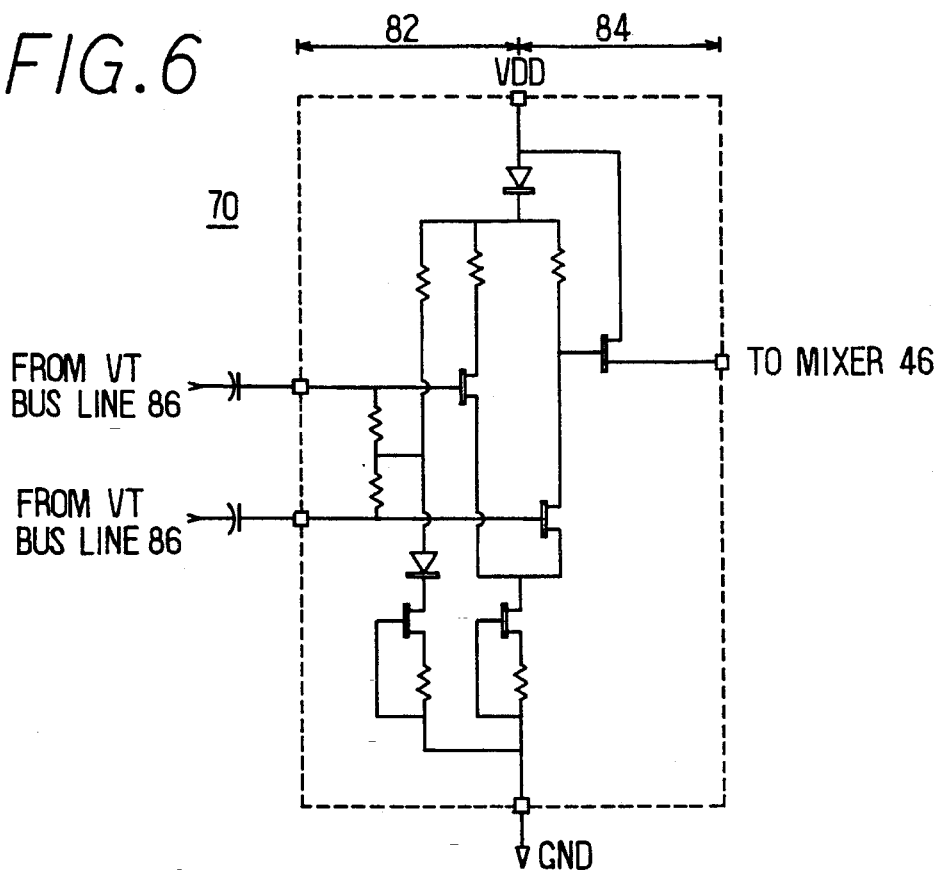
FIG. 6 is a schematic diagram of an output amplifier subcircuit of the DRFDM$^2$ of FIG. 4.

As noted above, the balanced buses $68_1$ and $68_2$ are connected to output amplifiers $70_1$ and $70_2$, and a representative output amplifier 70 is shown in FIG. 6. The output amplifier 70 includes a differential pair amplifier stage 82 receiving the signals on a bus 68 and providing signal amplification and balanced to unbalanced signal conversion. The output of the differential amplifier stage 82 is fed to a single-ended open source follower stage 84 for output drive. The output of the source follower 84 is fed to an IF mixer 46 as described above.

Figure 7:
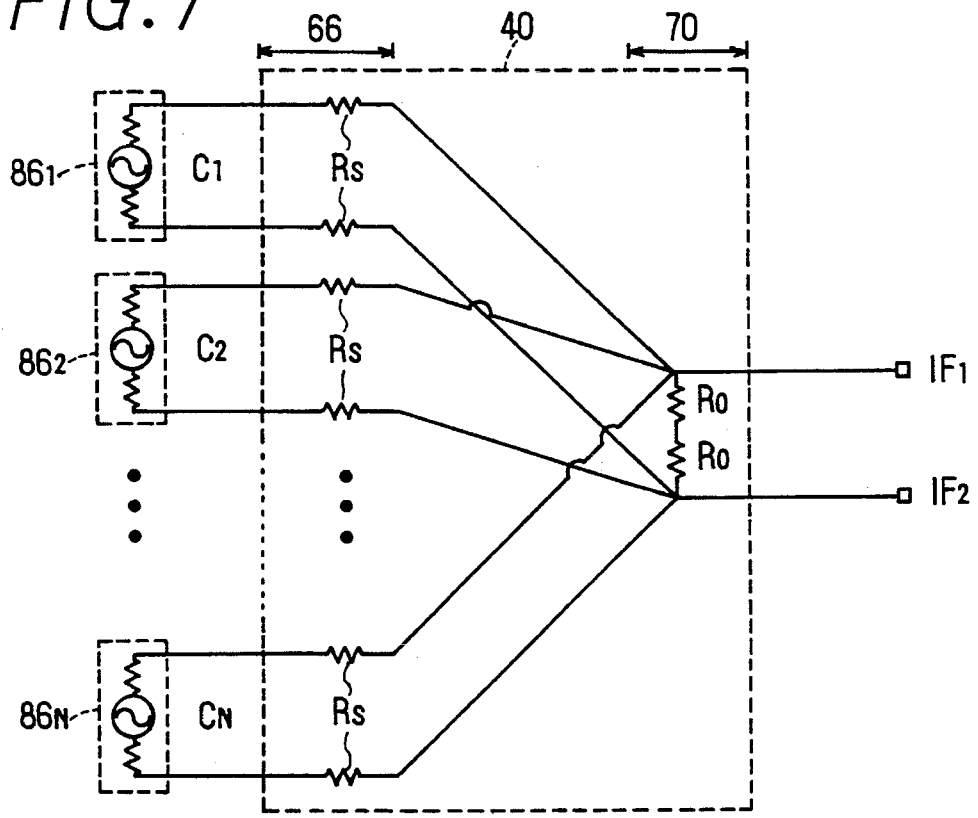
FIG. 7 shows the signal combining operation of the DRFDM$^2$ of FIG. 4.

With the operation of the input amplifier/switch subcircuit 66 and output amplifier 70 in mind, the signal combining operation of the DRFDM$^2$ 40 can be better understood. FIG. 7 shows the effective resistor network seen by the input signals $C_1$-$C_N$ when electrically connected to one of the output amplifiers 70. Here, each input amplifier/switch subcircuits $66_1$-$66_N$ appears to its corresponding source $86_1$-$86_N$ as a pair of resistances $R_1$-$R_N$ which correspond to the resistors shunting the series-connected transistors in the switch sections $80_1$ and $80_2$, and the series-connected resistors on the input of the differential amplifier stage 82 of the output amplifier 70 appear as resistances $R_o$. Then, letting the voltage from source $C_k$ be $V_k$, $$\frac{V_A - V_1}{R_S} + \frac{V_A - V_2}{R_S} + \ldots + \frac{V_A - V_N}{R_S} + \frac{V_A - V_B}{2R_O} = 0$$

and since the effective circuit is symmetrical and $V_B = -V_A$, the above equation reduces to $$V_A = -V_B = \frac{R_O}{3R_O + R_S} (V_1 + V_2 + \ldots + V_N)$$

Thus, since all currents from the sources $86_1$-$86_N$ flow into and out of the resistances $R_o$, a voltage drop representative of the sum of the signals $C_1$-$C_N$ appears across them, and a virtual ground is formed at the series connection therebetween.

When the number of input and outputs to be switched is relatively low, the DRFDM$^2$ 40 as described above may be implemented as a single integrated circuit for size and power consumption minimization. When a large number of inputs and outputs must be switched and fabrication technologies do not permit integration on a single chip, the DRFDM$^2$ 40 may be implemented with modulators 64, input amplifier/switch subcircuits 66 and output amplifiers 70 on different ICs. This approach also provides greater flexibility, since the switching capacity of the DRFDM$^2$ 40 may be expanded in a modular fashion.

Typically, PCS base stations operate at frequencies in excess of 10 MHz, and at such frequencies GaAs FET circuits offers significant advantages over other fabrication technologies in terms of signal path distortion and isolation. Other potentially useful fabrication technologies include silicon-on-insulator MOSFET and BiCMOS circuits.

Figure 8:
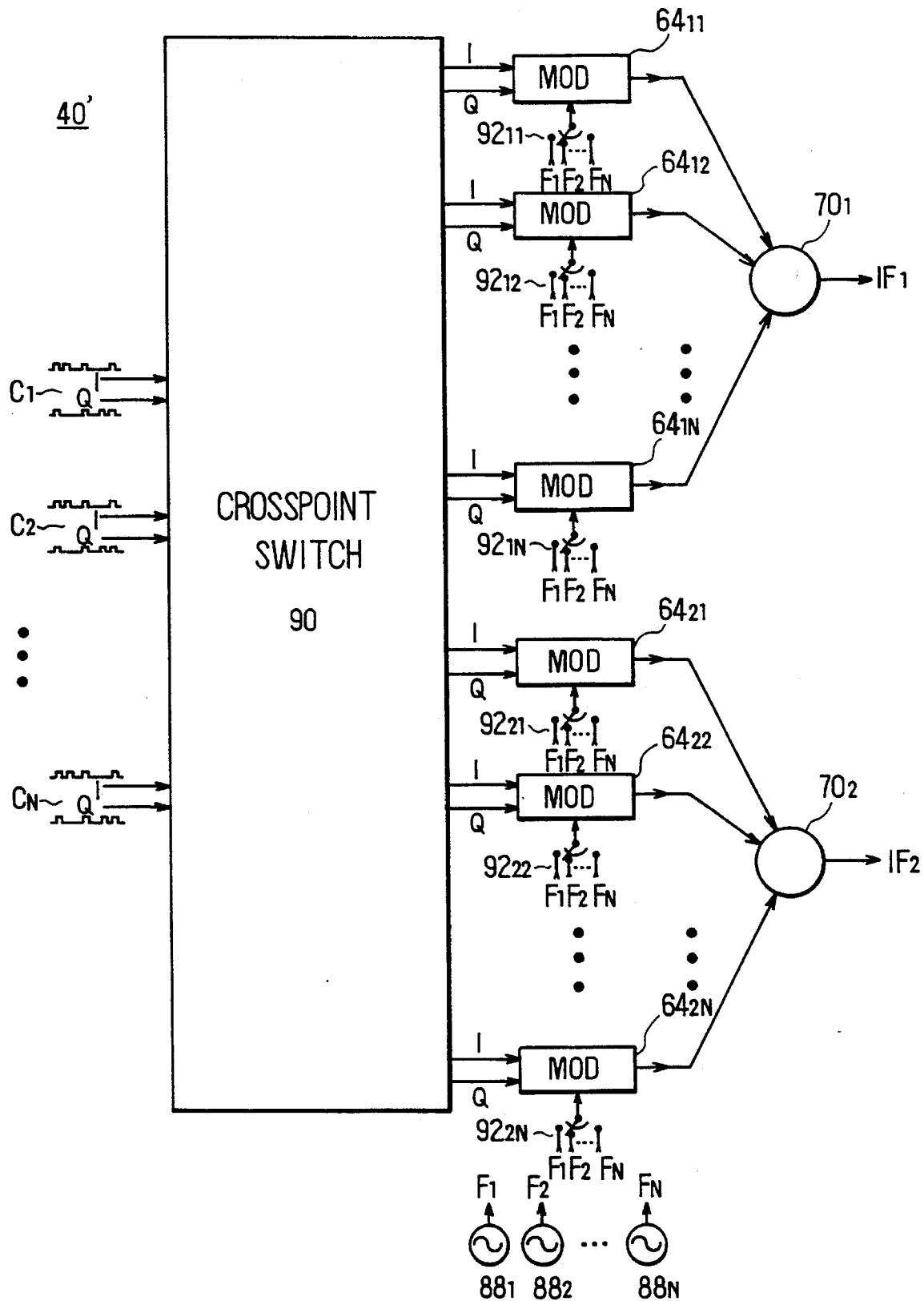
FIG. 8 is a block diagram of a DRFDM$^2$ according to a second embodiment of the present invention.
Figure 9:
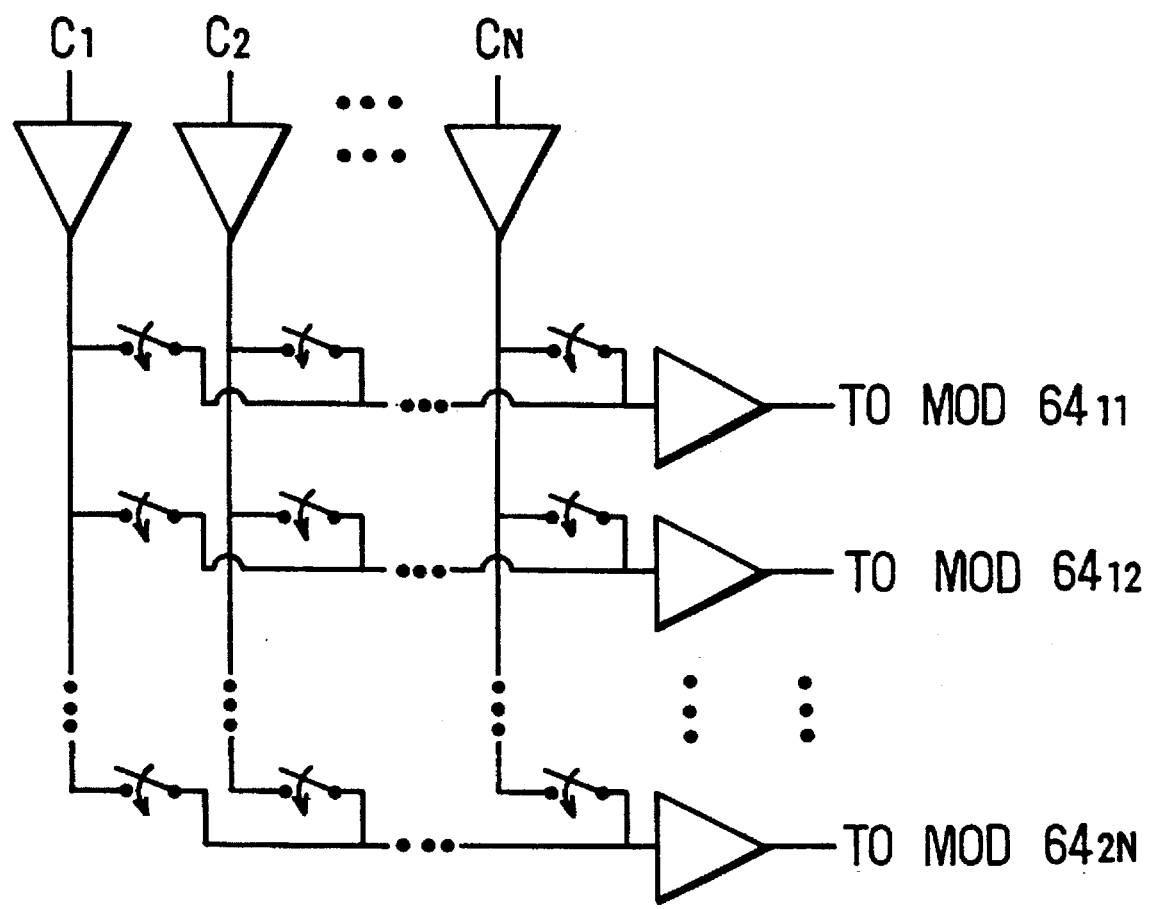
FIG. 9 shows a crosspoint switch used in the DRFDM$^2$ of FIG. 9.

In a second embodiment of the present invention, a DRFDM$^2$ 40' shown in FIG. 8 includes modulators $64_{11}$-$64_{2N}$ which are not connected to dedicated, variable -frequency local oscillators $42_1$-$42_N$; rather, each can be selectively connected to one of a bank of fixed frequency local oscillators $88_1$-$88_N$, each of which generates one of the FDM component frequencies. In this case, the input channels $C_1$-$C_N$ are supplied to the modulators via a crosspoint switch 90 (schematically shown in FIG. 9) which can arbitrarily connect any of the N input channels $C_1$-$C_N$ to any of the modulators $64_{11}$-$64_{2N}$. Also, the local oscillators $88_1$-$88_N$ are selectively coupled to the modulators $64_{11}$-$64_{2N}$ via one-of-N switches $92_{11}$-$92_{2N}$ and the outputs of modulators $64_{11}$-$64_{2N}$ are fed directly to the output amplifiers $70_1$ and $70_2$.

The above-described second embodiment eliminates the need for the input amplifier/switch subcircuits $66_1$-$66_N$ and variable frequency local oscillators $42_1$-$42_N$; however, to do so it adds crosspoint switch 90 and one-of-N switches $92_{11}$-$92_{2N}$; further, since the modulators $64_{11}$-$64_{2N}$ are permanently connected to either output amplifier $70_1$ or $70_2$, the dynamic reconfigurability of this version of the DRFDM$^2$ is somewhat restricted. Also, to handle the worst-case scenario where all N input channels $C_1$-$C_N$ are connected to either output amplifier $70_1$ or $70_2$, it is necessary to connect N modulators to each of the output amplifiers $70_1$ and $70_2$; thus, the second embodiment may require twice as many modulators as the first embodiment.

Figure 10:
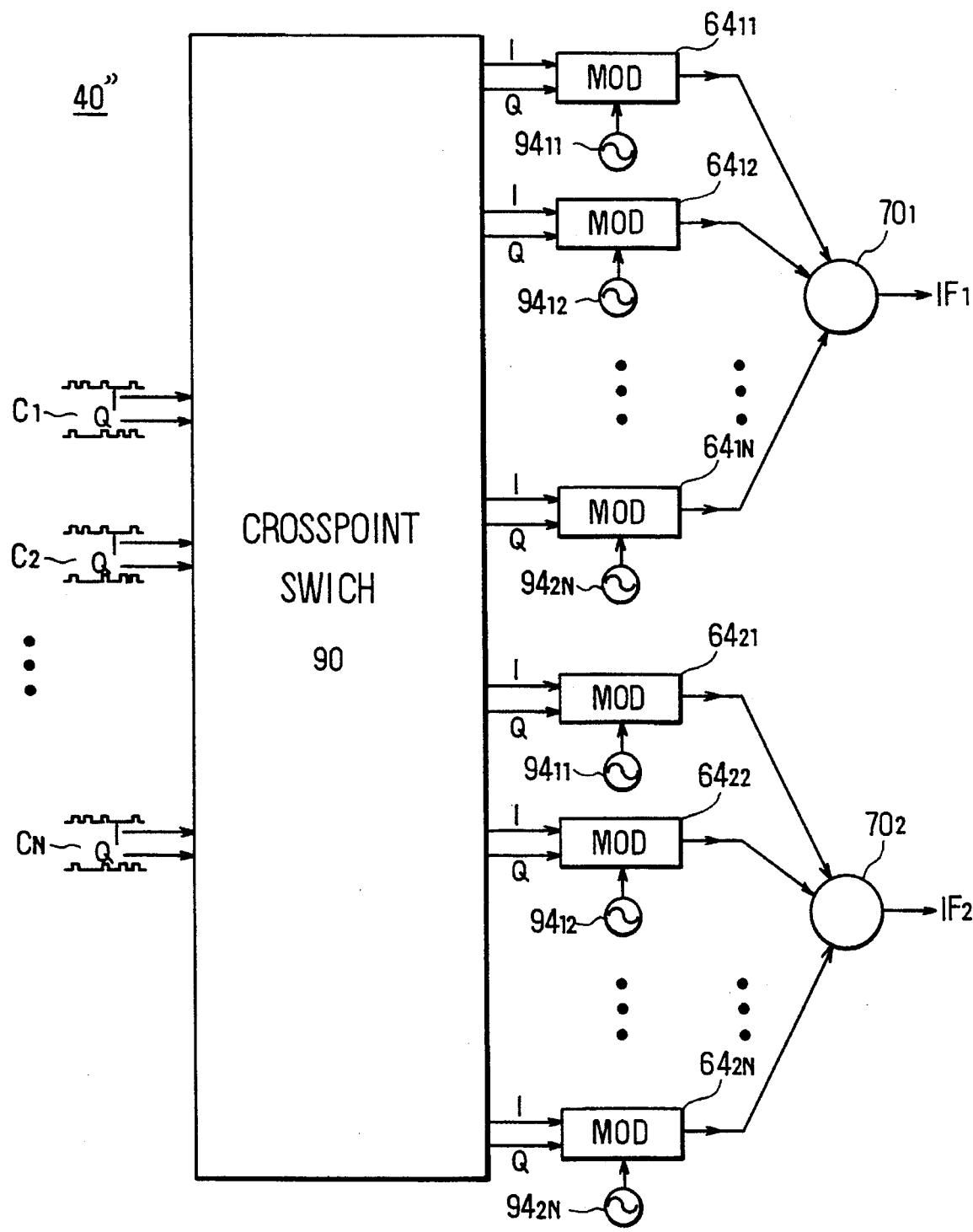
FIG. 10 is a block diagram of a DRFDM$^2$ according to a third embodiment of the present invention.

As a further variation, a third embodiment of the present invention combines the first embodiment's variable frequency local oscillators with the second embodiment's crosspoint switch 90 as shown in FIG. 10. This DRFDM$^2$ 40" has the advantage of eliminating the one-of-N switches $92_{11}$-$92_{2N}$ of the second embodiment; however, the local oscillators $94_{11}$-$94_{2N}$ must be capable of variable frequency operation. Moreover, although the local oscillators $42_{11}$-$42_{2N}$ in the first embodiment only needed to be able to change frequencies once every TDM frame, the local oscillators $94_{11}$-$94_{2N}$ must be able to switch frequencies every time slot within the TDM frame.

Although the present invention has been fully described in connection with the preferred embodiment thereof with reference to the accompanying drawings, it is to be noted that various changes and modifications will become apparent to those skilled in the art. For example:

while the above embodiments of the DRFDM$^2$ use two FDM outputs, the DRFDM$^2$ may be readily adapted to accommodate any arbitrary number of outputs;

although the above embodiments are used in conjunction with quadrature amplitude modulation, any appropriate modulation or encoding technique can be used;

while the above embodiments are used in conjunction with the transmission of digital data, the DRFDM$^2$ can be readily adapted to accommodate analog data as well;

while the above embodiments are used in conjunction with quadrature amplitude modulated signals, the DRFDM$^2$ can be readily adapted to accommodate other amplitude, frequency or phase modulation techniques as well;

although the above embodiments are used in conjunction with TDM input data, the input channel signals need not be time division multiplexed;

while the local oscillators in the above embodiments operate at IF frequencies, RF oscillators may be used and the subsequent mixer circuitry eliminated;

although antenna selection in the above embodiments is performed on the basis of monitored antenna receive signals, other selection criteria may also be used;

while the above embodiments have been used to implement antenna diversity and thereby compensate for multipath propagation distortion effects, the invention may be used with other diversity techniques, and may be used to implement functionality other than multipath propagation distortion compensation; and although the above embodiments are implemented in a PCS base station, the invention may be used in a wide variety of communication systems and in portable terminals as well as base stations.

Such changes and modifications are to be understood as being included within the scope of the present invention as defined by the appended claims.

What is claimed is:

1. An electronic circuit comprising:

a plurality of local oscillators each generating a carrier signal;

a plurality of modulators, each connected to an output of a corresponding one of said plurality of local oscillators and modulating said each carrier signal therefrom responsive to an input channel signal applied to an input of said modulator to generate a modulated signal;

a plurality of switching means, each receiving said modulated signal from a respective one of said plurality of modulators, for selectively providing its modulated signal at one of a plurality of outputs of said switching means responsive to a signal at a control input of said switching means; and a plurality of summing means, each connected to a respective output of each of said plurality of switching means, for summing signals from said respective outputs and for generating an output signal representative thereof.

2. The circuit of claim 1, wherein each of said plurality of local oscillators has a control input and generates said carrier signal responsive to a value of said control signal.

3. The circuit of claim 1, said switching means comprising:

an input amplifier receiving and amplifying said modulated signal; and a switch receiving said amplified signal and selectively providing said amplified signal to an output of said switching means responsive to said signal at said control input of said switching means.

4. The circuit of claim 3, wherein:

said amplified signal is a balanced signal comprising two portions; and said switch comprises two sections, each of which switches one of said portions.

5. The circuit of claim 1, wherein said outputs of said switching means are balanced outputs.

6. A transmitter comprising:

a source of plural channels of input signals;

processing means connected to said source for, responsive to a control signal applied thereto, grouping said input signals into a plurality of groups and generating a plurality of frequency division multiplexed signals corresponding to said groups, each of said frequency division multiplexed signals being representative of input signals in its corresponding group;

radio signal generating means receiving said plurality of frequency division multiplexed signals and generating a plurality of radio frequency signals each representative of one of said frequency division multiplexed signals; and a plurality of antennas each radiating one of said radio frequency signals.

7. The transmitter of claim 6, wherein:

said plural channels of input signals are time division multiplexed signals; and said processing means includes local oscillators whose frequencies change synchronously with a frame of said time division multiplexed signals.

8. The transmitter of claim 6, wherein:

said plural channels of input signals are time division multiplexed signals; and said processing means includes local oscillators whose frequencies change synchronously with multiplexed components of said time division multiplexed signals.

9. The transmitter of claim 6, further comprising:

a plurality of demultiplexers, each connected to a respective one of said antennas, for processing a signal received by its respective antenna to generate demultiplexed signals corresponding to frequency division multiplexed components thereof; and means for, for corresponding ones of said demultiplexed signals from each of said plurality of demultiplexers, determining an optimal signal among said corresponding demultiplexed signals according to a predetermined criteria, and controlling said processing means so that a radio frequency signal having a component corresponding to said corresponding ones of said demultiplexed signals is radiated from an antenna receiving said optimal signal.

10. A signal processing system comprising:

a source of a plurality of input channels of time division multiplexed data; and processing means for receiving said plurality of input channels, forming groups of said input channels responsive to a control input, each of said groups including a selected set of individual frequency channels, each of which contains selected time division multiplexed data channels, and generating a plurality of signals each representative of one of said groups.

11. A signal processing system comprising:

a source of a plurality of input channels of time division multiplexed data; and processing means for receiving said plurality of input channels, forming groups of said input channels responsive to a control input, and generating a plurality of frequency division multiplexed signals each representative of one of said groups, said processing means including a plurality of modulators, each modulator corresponding to one of said input channels, said modulators receiving said input channels and generating modulated carrier signals representative thereof responsive to a first control input, and a plurality of summing amplifiers, each receiving at least one of said modulated carrier signals and generating a frequency division multiplexed signal representative thereof.

12. The signal processing system of claim 11, wherein each of said modulators includes a dedicated local oscillator responsive to said first control input.

13. The signal processing system of claim 11, wherein:

said system further comprises a plurality of local oscillators each generating an unmodulated carrier signal; and each of said modulators comprises a modulation section and a switch supplying one of said unmodulated carrier signals to said modulation section responsive to said first control input.

14. The signal processing system of claim 11, further comprising a plurality of switches selectively supplying said modulated carrier signals from said modulators to said summing amplifiers responsive to a second control input.

15. The signal processing system of claim 11, further comprising a crosspoint switch selectively supplying said input channels to said modulators responsive to a second control input.

16. A method of processing signals, said method comprising the steps of:

time division multiplexing a plurality of input signals to produce a plurality of time division multiplexed signals; and generating a plurality of frequency division multiplexed channels, each frequency channel of which contains time division multiplexed channels, said plurality of frequency division multiplexed channels and said plurality of time division multiplexed channels being selected according to a control input.

17. A method of processing signals, said method comprising the steps of:

time division multiplexing a plurality of input signals to produce a plurality of time division multiplexed signals; and generating a plurality of frequency division multiplexed signals, each representative of time division multiplexed signals in said plurality of time division multiplexed signals selected according to a control input, said generating step including the steps of modulating a plurality of carrier signals with a respective time division multiplexed signal to produce a plurality of modulated carrier signals, and generating each of said frequency division multiplexed signals by summing selected ones of said plurality of modulated carrier signals.

18. The method of claim 17, said modulating step comprising the step of generating said plurality of carrier signals using a plurality of variable frequency local oscillators responsive to a part of said control input.

19. The method of claim 17, said modulating step comprising the step of, for each of said time division multiplexed signals, selecting one of a plurality of carrier signals generated by a plurality of fixed frequency local oscillators responsive to a part of said control input.

20. The method of claim 17, said modulating step comprising a step of selectively providing, responsive to a part of said control input, each of said time division multiplexed signals to one of said modulators.

21. The method of claim 17, said generating step comprising the step of, for each of said frequency division multiplexed signals, selecting modulated carrier signals in said plurality of modulated carrier signals to be summed together responsive to a part of said control input.

* * * * *